United States Patent [19]

Janes

[11] 3,768,754
[45] Oct. 30, 1973

[54] LOUVER SYSTEM WITH SANDWICH TYPE BLADES

[75] Inventor: Manfred Janes, Voorschoten, Netherlands

[73] Assignee: Organisation Europeene de Recherches Spatiales, Paris, France

[22] Filed: Jan. 20, 1972

[21] Appl. No.: 219,232

[30] Foreign Application Priority Data
Jan. 26, 1971  Belgium .................................. 98974

[52] U.S. Cl.......................... 244/1 SC, 49/1, 160/1, 244/1 SS
[51] Int. Cl. ............................................. B64g 1/10
[58] Field of Search ......................... 244/1 SS, 1 SC; 136/89, 86 R; 160/1, 236; 49/1, 25, 74; 250/203 R, 205, 237 R, 238; 102/105; 165/13, 23, 32, 41

[56] References Cited
UNITED STATES PATENTS
3,031,351  4/1962  McIlvaine ...................... 250/237 R
3,110,936  11/1963  Berard ............................ 160/236 X
3,290,823  12/1966  Okumoto ........................ 160/236 X
3,441,444  4/1969  Chesner et al. .................... 136/86 R Primary Examiner—Milton Buchler
Assistant Examiner—Barry L. Kelmachter
Attorney—Milton J. Wayne et al.

[57] ABSTRACT

A louver system to be used on spacecrafts and space vehicles, comprising movable panels mounted on a support means, each being adapted to rotate about an axis parallel to the surface of the support means, and actuators sensitive to the temperature of said support means for moving the panels about their respective axis. Each panel consists of two substantially parallel blades that are not in thermal contact with each other, the outer surfaces of the two blades having high reflectance and thermal emissivity factors and the two inner surfaces thereof which are facing each other having a low emissivity factor.

2 Claims, 2 Drawing Figures

LOUVER SYSTEM WITH SANDWICH TYPE BLADES

The present invention relates to a louver system intended for being used on spacecrafts and space vehicles.

Louver systems are used to control the skin temperature of spacecrafts and space vehicles during their mission and to maintain it within prescribed limits. Such systems usually comprise movable panels mounted on a base plate comprised of the outer skin of the spacecraft or space vehicle or on a support member placed inside thereof, said panels being operated by suitable actuators. The latter are temperature sensitive elements such as bimetal blades which are effective to change the panel orientation i.e. their opening angle depending on the base plate temperature (support member or outer skin). The higher said temperature, the wider the opening angle. The actuation of the panels may be effected in any conventional manner, such as, for example, by means of the type disclosed in U.S. Pat. No. 3,441,444. This patent also discloses a support structure for louvers.

The prior art louver systems are only capable of operating in the shade since they have detrimental effects in full sunshine. When the panels are in a partially opened position, they are trapping sunlight thereunder, thereby causing the vehicle skin temperature to increase dangerously.

To obviate this drawback it would have been possible to provide the louver panels with a reflecting coating. However, when the vehicle orientation is such that the panels are in the shade, said coating would act as a thermal barrier to radiation.

The foregoing problem is solved by the arrangement of the invention which is capable of operating in the shade as well as in full sunshine.

This invention comprises louver panels each consisting of two substantially parallel blades that are not in thermal contact with each other. The outer surfaces of the two blades have high reflectance and thermal emissivity factors and the two inner surfaces thereof which are facing each other have a low emissivity factor.

According to a particular embodiment each louver blade comprises a first layer of transparent material and a second layer made of a metal deposited onto a surface of said first layer; and the second layers of the two louver blades are facing each other.

The surface of the base plate which is facing the louver panels can comprise a reflecting layer having a structure similar to that of the louver blades.

The above and other features of this invention will be apparent from the following description which is to be read in connection with the accompanying drawings, wherein.

Figure 1:
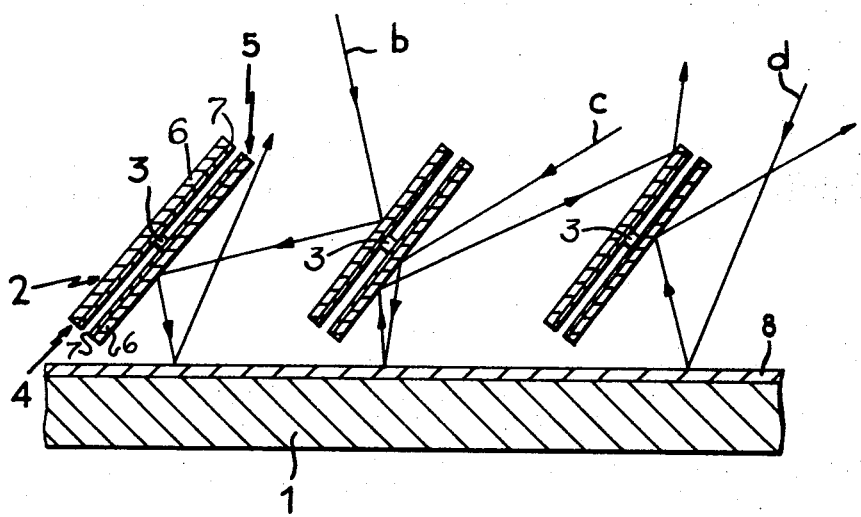
FIG. 1 is a schematic sectional view of a louver system embodying the invention.

Referring to FIG. 1 there is shown in cross-sectional view a portion of a base plate 1 having movable louver panels such as 2 mounted thereon, said panels being respectively rotatably mounted on a plurality of axes 3 that are parallel to the outer surface of base plate 1. As mentioned above, the base plate can be mounted inside of the vehicle or on the wall thereof. The panels 2 are operated through actuators (not shown) which are sensitive to the base plate temperature.

According to the invention, each movable panel 2 comprises two parallel blades 4 and 5 each of which has an outer layer 6 and an inner layer 7 and which are mounted on both sides of the rotation axis 3 and are spaced from each other so as not to be in thermal contact with each other. The two outer layers 6 have high reflectance and emissivity factors whereas the two inner layers 7 which are facing each other have a low emissivity factor.

Figure 2:
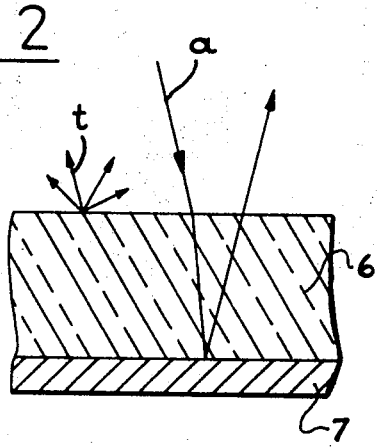
FIG. 2 is a sectional view showing the blade structure of the invention.

More specifically, as shown in FIG. 2, each outer blade layer 6 comprises a substrate made of a transparent material such as quartz, and the inner layer 7 is formed of metal such as silver or aluminum for instance. The metal layer 7 can be vapor deposited onto substrate 6. A characteristic feature of this louver structure is that the two outer panel layers 6 are thermally decoupled and that the two layers 6 and 7 fulfil two different functions as will be apparent from the disclosure to follow.

Heretofore it was assumed that the internal thermal conductance of the louver panels is or may be considered as isothermal. The invention cancels said assumption out. The outer louver surface which looks towards space when the panels are in a closed position takes over the function of a solar reflecting skin. Incident radiation from space is reflected on outer layer 6 of any louver panel as shown by incident radiation $a$ in FIG. 2. In addition, since the outer layer 6 has a high emissivity value, it emits thermal energy as indicated by arrows $t$ on FIG. 2, thereby causing its temperature to be lower than that of the other layer 7. In this way there is a temperature gradient which is negative in the direction towards space such that in effect substantially no energy from space can enter the louver system. The high emittance of the louver blade layer 6 facing the base plate when the louver panel is in a closed position and the base plate itself causes energy exchange to occur between these two surfaces in the wavelength region of the thermal radiation so that the temperature of both surfaces of layer 6 and base plate 1 can be assumed to be substantially equal as long as the louver system is in a fully closed position.

The low emittance of both inner layers 7 causes the two outer layers 6 to be substantially completely thermally decoupled. Energy loss is thus prevented as long as the louver system is in a closed position. In this way the vehicle's wall temperature can be strictly controlled and maintained within prescribed limits. The temperature range wherein the system can operate, i.e., while maintaining the vehicle's wall temperature within the prescribed limits, is determined by selecting the suitable emissivity values for the inner layers 7.

When the louver panels are in a partially opened position, incident radiation from space is reflected on the two blades 4 and 5. The base plate is then impinged by a part of said reflected radiation as shown by radiation indications $b$ and $c$ on FIG. 1, as well as by radiation directly incident from space such as radiation indication $d$ on FIG. 1. To protect the base plate against radiation, there is provided thereon a reflecting skin 8 (see FIG. 1) similar to the metal layer blades 4 and 5. In this way, incident radiation is reflected towards space, possibly after having been reflected several times between reflecting louver blades and base plate. Due to the high emittance of the outer wall of base plate, this emits thermal energy directly towards space and the temperature thereof is thus reduced.

The device thus realized permits an efficient temperature control of the walls of spacecrafts and space vehicles to be achieved in full sunshine as well as in the shade.

It is to be understood that the invention is not limited to the particular embodiments described hereinbefore and that many changes and variations can be made by those skilled in the art. For example, one or more intermediate layers can be provided between transparent substrate 6 and metal layer 7, said intermediate layers being made for instance of a metal compound such as $ZrO_2$ or $MgF_2$ in order to increase reflectance of the metal layer.

What is claimed is:

1. In a spacecraft of the type having a surface, a plurality of louver panels mounted for rotation about parallel axes adjacent said surface with said axes being parallel to said surface, and thermally responsive means for controlling the angular displacement of said panels about their respective axes; the improvement wherein each said panel is comprised of a pair of substantially parallel blades spaced apart so as not to be in thermal contact with each other, the axis of rotation of each said pair of blades being vertically disposed between the blades of each pair of blades, each blade of each said pair of blades having one surface with high reflectance and emissivity factors, the blades of each pair of blades being mounted with the low emissivity surfaces facing each other, and wherein said surface of said spacecraft is reflective.

2. The spacecraft of claim 1 wherein each said blade is comprised of a layer of transparent material forming the surface thereof having high reflectance and emissivity characteristics, and a layer of a metal deposited on said transparent material and forming said surface with low emissivity factor.

* * * * *